United States Patent [19]
Halahmi et al.

[11] Patent Number: 5,887,179
[45] Date of Patent: Mar. 23, 1999

[54] SYSTEM POWER SAVING MEANS AND METHOD

[75] Inventors: Dror Halahmi, Tel Aviv; Eitan Zmora, Jerusalem; Chen Goldenberg, Tel Aviv, all of Israel

[73] Assignee: Motorola, Inc., Schaumburg, Ill.

[21] Appl. No.: 807,129

[22] Filed: Jun. 11, 1996

[51] Int. Cl.[6] .................................................. G06F 1/00
[52] U.S. Cl. .............................. 395/750.06; 395/750.03
[58] Field of Search ......................... 395/750.01–750.08; 364/707

[56] References Cited

U.S. PATENT DOCUMENTS

| | | | |
|---|---|---|---|
| 5,167,024 | 11/1992 | Smith et al. | 395/750.04 |
| 5,218,704 | 6/1993 | Watts, Jr. et al. | 395/750.04 |
| 5,388,265 | 2/1995 | Volk | 395/750.04 |
| 5,430,881 | 7/1995 | Ikeda | 395/750.04 |
| 5,440,747 | 8/1995 | Kiuchi | 395/750.05 |
| 5,495,617 | 2/1996 | Yamada | 395/750.05 |
| 5,560,024 | 9/1996 | Harper et al. | 395/750.04 |
| 5,579,493 | 11/1996 | Kiuchi et al. | 395/750.03 |
| 5,649,213 | 7/1997 | Kurihara | 395/750.05 |

*Primary Examiner*—Meng-Ai T. An
*Assistant Examiner*—Paul R. Myers

[57] ABSTRACT

An apparatus (12) and method (80, 120) is described for reducing power consumption in a system (10) having subsystems (34). A controller (40, 40', 40") detects the occurrence of a repetitive operation (62). The subsystems (34, 38) or a power down controller (39) detect (86, 128), whether a subset (60i) of the subsystems (34) is or is not participating in the repetitive operation (62). This preferably occurs during the first iteration (661–662) of the repetitive operation (62). Power controls (36) in or coupled to (39) the subsystems (34), reduce the power consumption of this subset (60i) of the subsystems (34) until the repetitive operation (62) is completed (642), whereupon power thereto is restored (114, 190). In the event of an interrupt (643–644), the subset (60i) is maintained (142) or returned (172) to full power operation until the interrupt (643–644) is finished (144, 174) and the repetitive operation resumes (644–642).

10 Claims, 4 Drawing Sheets

SYSTEM POWER SAVING MEANS AND METHOD

FIELD OF THE INVENTION

This invention concerns a means and methods for reducing power consumption in digital processors.

BACKGROUND OF THE INVENTION

In many systems in which processors are utilized, especially microprocessors, it is very important to reduce the system power consumption to a minimum. To minimize system power it is generally desirable to reduce power consumption in the controlling processor as well as any peripherals, since the processor often consumes a significant portion of the total system power.

It is generally known to conserve system power by turning off peripherals that are not currently is use. However, this does not minimize processor power consumption since the processor is generally still running. Accordingly, there continues to be a need for improved power conservation means and methods that are applicable to the central processor itself as well as to the system as a whole.

As used herein, the word "processor" is intended to refer to any kind of signal processor, as for example and not limited to, digital signal processors, microprocessors and microcontrollers. The processor can be a single microchip or made up of an interconnected set of chips or boards, depending upon the size of the system and needs of the user.

DETAILED DESCRIPTION OF THE PREFERRED EMBODIMENT

Figure 1:
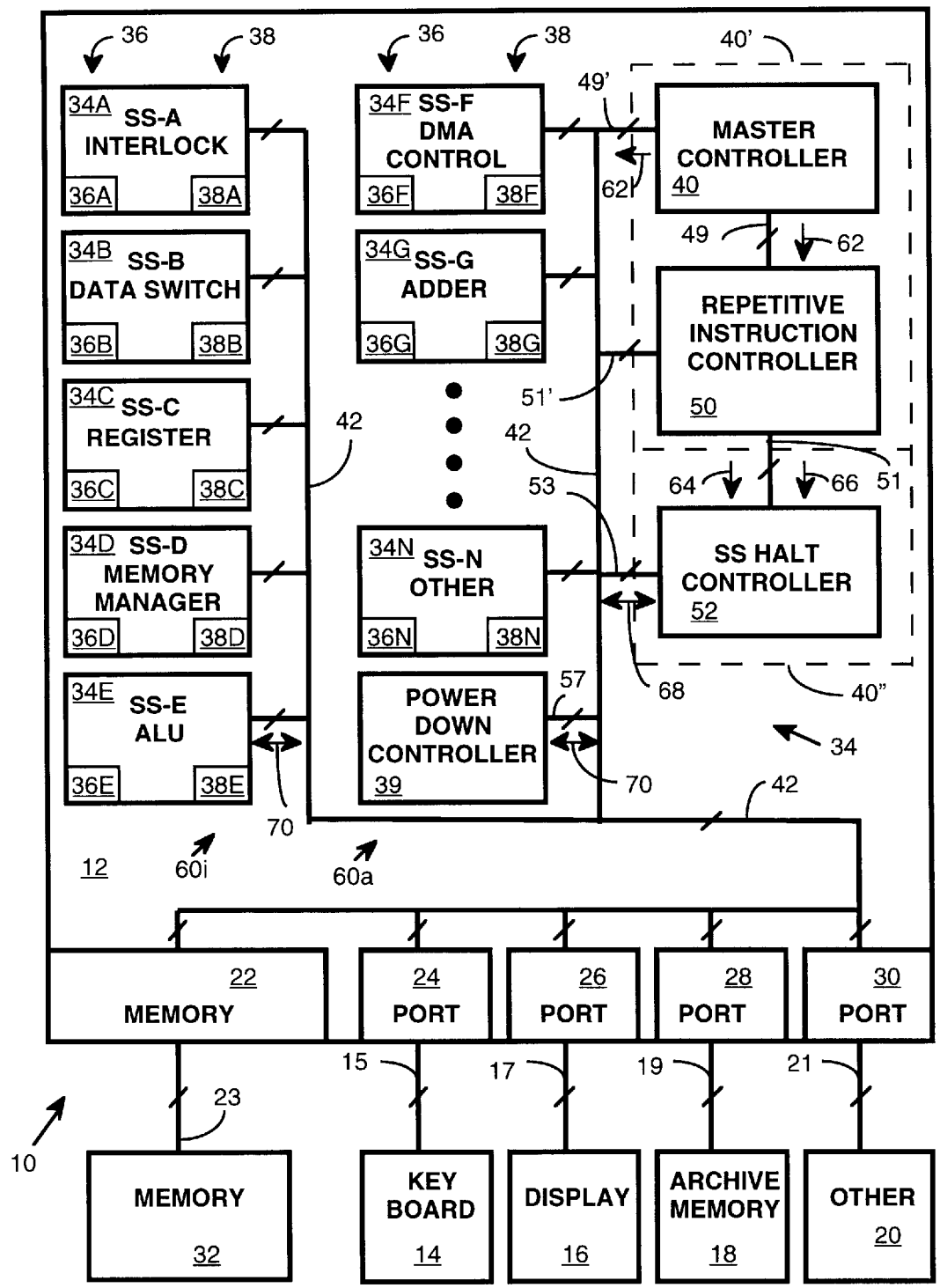
FIG. 1 is a simplified schematic block diagram illustrating a preferred embodiment of the present invention.

FIG. 1 is a simplified schematic block diagram illustrating system 10 according to a preferred embodiment of the present invention. System 10 comprises processor 12 and various peripherals 14–20, as for example, but not limited to, keyboard or other input device 14, display or other output device 16, archive or other external memory 18, and other peripherals 20. Keyboard 14 is intended to represent any form of input device and display 16 is intended to represent any form of output device. Non-limiting examples of other types of input devices are key-pads, touch-screens, optical and electrical switches, microphones and various sensors, such as for example, electrical, magnetic, audio, optical, thermal, mass-flow, and chemical sensors. Non-limiting examples of various types of displays are visible, audible, thermal, optical, electrical and mechanical displays.

Processor 12 conveniently contains memory 22 and various ports 24–30 for coupling processor 12 via buses 15, 17, 19, 21 to peripherals 14, 16, 18, 20. While memory 22 is conveniently provided within processor 12, this is not essential and some or all of the memory 22 addressed by processor 12 can be external, as indicated by memory 32 coupled to processor 12 by bus 23. For the purposes of this invention, it does matter whether memory 22, 32 is internal or external to processor 12.

Processor 12 conveniently has elements referred to as subsystems (abbreviated as "SS") A–N and designated collectively by reference number 34 and individually by reference numbers 34A for SS-A, 34B for SS-B and so forth through 34N for SS-N. Any type of subsystems can be associated with processor 12. By way of example, SS-A is an interlock controller, SS-B a data switch controller, SS-C one or more registers, SS-D a memory manager, SS-E an ALU, SS-F a DMA controller, SS-G an adder, up to SS-N which represents any other type of subsystem or element operating in conjunction with or under the control of or as part of processor 12. Thus, subsystems A–N, identified collectively by reference number 34 and individually by 34A–34N are intended to represent any type of subsystem or peripheral that forms a part of processor 12 or system 10. Some or all of subsystems 34A–34N have within them power control circuits 36A–36N, collectively referred to as 36 and activity sensing circuits 38A–38N, collectively referred to as 38. The purpose of control circuits 36 is to power-down the subsystem with which they are associated in response to a command. The command can be provided internally by circuit 38 or over bus 42 from controller 39 or a combination thereof It is not essential that every subsystem have a power control circuit 36 and activity sensing circuit 38. These are only desirable within those subsystems which are likely to be inactive during repetitive operations or any other operation that the processor is designed to use for power conservation. There is also provided in processor 12, optional power-down controller 39, which functions in conjunction with or independently of power control circuits 36.

Master controller 40 interprets the program being executed by processor 12 and provides the instructions to subsystems or elements 14–34 that are needed to execute the instructions along bus 42, via bus connections 49, 49', 51, 51', 53. Processor 12 according to the present invention, has repetitive instruction controller 50 and subsystems halt controller 52 coupled to some or all of subsystems 34. Repetitive instruction controller 50 and subsystems halt controller 52 are coupled by bus connection 51. Sub-systems halt controller 52 is coupled by bus connection 53 to subsystems bus 42. Buses or bus connections 42, 49, 49', 51, 51', 53 allow various elements or subsystems 22–34 within processor 12 (as well as elements 14–20, 32 external to processor 12) to communicate with each other for the purpose of sending and receiving instructions, data, flags, start or halt signals, etc. Persons of skill in the art will understand, based on the description herein, how to use buses and bus connections for such purposes. Bus connections 49', 51' running from elements 40, 50 to master bus 42 illustrate alternative ways of coupling elements 40, 50 to each other and to elements 34, 52.

The present invention reduces the power consumption of processor 12 by providing within or accessible to processor 12, logic and program instructions for controlling frequently executed repetitive instructions so that those portions of processor 12 or system 10 that are not essential for the performance of the repetitive instruction are turned off during execution of the repetitive instruction. Thus, significant portions of processor 12 can stop drawing power during the performance of a repetitive instruction. This differs from prior art schemes for shutting off peripherals because, among other things, the present invention can deal with any kind of repetitive instruction affecting different elements within (or without) processor 12 and not merely particular peripherals as has been the case with prior art power saving arrangements.

A particular example of repetitive instruction is a "DO-LOOP." In a typical DO-LOOP, appropriate elements of the processor are commanded by the programming instructions to repetitively perform a logical operation on different sets of data or for different values of an index. An example of a programming instruction that produces a DO-LOOP is given below:

$$\text{FOR } i=1 \text{ to } n \text{ and } j=1 \text{ to } m, \text{ DO } Z=f(x_i,y_j), \qquad (1)$$

where the function $Z=f(x_i,y_j)$ is any logical operation. The limit values (n,m) can be large numbers so that a significant portion of processor time is used during execution of the DO-LOOP. For convenience of expression the term "DO-LOOP" as used herein is intended to include any form of repetitive instruction being executed by processor 12 and not merely that illustrated by Eq. (1).

In general, while processor 12 is executing a DO-LOOP, certain subsystems are busy and others are idle, depending upon which subsystems must be active for the particular DO-LOOP being performed. For convenience of expression, the various subsystems of processor 12 that are idle in response to a particular DO-LOOP are referred to as subsystem(s) 60i. It is the function of the present invention to place idle subsystems 60i of processor 12 temporarily into a power-down state or "sleep" state so that overall power consumption is minimized.

Figure 2:
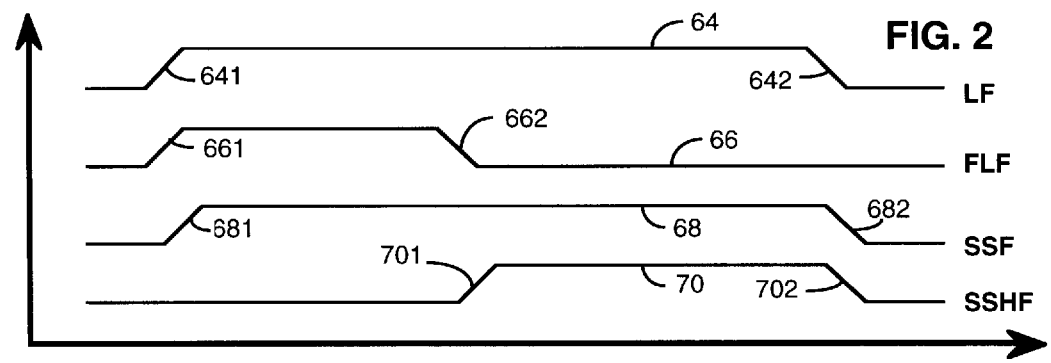

Referring now to FIGS. 1 and 2, repetitive instruction controller 50 detects the start of DO-LOOP instruction or signal 62 issued by master controller 48 to subsystems 34. Controller 50 does this by, for example, monitoring the instruction flow to subsystems 34 from master controller 48 and comparing them with a pre-determined set of instructions which precede or are required for execution of whatever DO-LOOPs are desired to result in a power-down sequence. However, any method for detecting the initiation of a DO-LOOP can be used. A non-limiting example of a preferred arrangement is to provide an identifying instruction as a part of the program instruction set for the processor, which instruction is provided at the beginning of a DO-LOOP. The instruction "DO(p,q)Z" is suitable, where p is an operand identifying the number of iterations to be performed, q is an operand identifying, for example, the address of the loop-end instruction, and Z defines the operation to be performed. Other arrangements such as will occur to those of skill in the art based on the description herein can also be used.

When DO-LOOP instruction or signal 62 is issued on bus 49, 49', the system is initialized. Controller 50 issues two commands of flags: (a) LOOP FLAG (abbreviated LF) signal 64 is issued to subsystems halt controller 52 via bus connection 51 and (b) FIRST LOOP FLAG (abbreviated FLF) signal 66 is issued (e.g., on bus connection 51 or 51') indicating that the first iteration of DO-LOOP instruction or signal 62 has commenced. When FLF 66 is asserted, subsystems halt controller 52 issues subsystem flag (SSF) signal 68 to subsystems 34, e.g., AFLAG to subsystem 34A, BFLAG to subsystem 34B to NFLAG to subsystem 34N, and so forth on bus 42. These are collectively referred to as "SSF" signal 68. As those of skill in the art will understand based on the description herein, subsystems 34 are intended to be representative of any of subsystems.

The presence of SSF signal 68 causes circuit 38 each of subsystems 34 to detect whether or not that particular subsystem is active during or as a consequence of the first DO-LOOP iteration. Circuit 38 can be any means of monitoring the activity of a subsystem. For example, a combination of a resistor coupled to a threshold circuit can be used to measure changes in current drain from the power supply or from the clock circuit and provide a logical output signal or flag. Alternatively, a logic circuit can be used to detect the presence of a flag that is set by any activity within the subsystem. Persons of skill in the art will understand based on the description herein and the function performed by a particular subsystem how to detect the presence or absence of logical activity within the subsystem. The output of circuit 38 is or is used to set subsystem halt flag (abbreviated SSHF) 70 which, as will be subsequently explained, can be used within a subsystem to activate circuit 36 or remotely to activate controller 39 or a combination thereof.

If the subsystem is active, it returns or cancels or resets its SSF and remains active until an "end DO-LOOP" indication is received from master controller 40. If it is not active, then its SSF signal remains asserted and, for example, each of inactive subsystems 60i asserts a corresponding subsystem halt flag (SSHF) 70, (e.g., AHALT, BHALT . . . NHALT). These are referred collectively as "SSHE" signals 70. SSHF signals 70 have the result that the inactive subsystems 60i power-down, that is, to they go into a "sleep" mode where their power consumption is much reduced. Active subsystems 60a are not affected.

Means and methods for inducing such "sleep" modes in electronic apparatus are well known in the art. For example, by locally reducing or shutting off the clock signal or reducing or disconnecting the power supply voltage or a combination thereof. These changes can be accomplished using transistors as switches or variable resistors within power control circuits 36 in subsystems 34 in a manner well known in the art. In the event that it is desired to vary the clock frequency, circuit 36 can include a frequency divider or cycle stealer or other logic permitting the effective clock frequency to be varied. Circuits for performing such functions are well known in the art.

Inactive subsystems 60i can be caused to power down in various ways using, for example, local control or centralized control or a combination thereof. With the centralized approach, power down controller 39 senses via bus connection 57 or other lines (not shown) the activity of each of subsystems 34. When subsystems 60i are determined to be inactive during the first DO-LOOP, e.g., when subsystems 60i or controller 38 assert SSHF 70, controller 39 instructs subsystems 60i to go to sleep directly or indirectly. Controller 39 can, either via bus 42 or by separate lines (not shown), reduce or stop the clock or supply voltage for the inactive subsystems. Alternatively, controller 39 can command control circuits 36 within inactive subsystems 60i to execute the power down ("sleep") command.

With the distributed approach, controller 39 is not necessary. Each subsystem 34 monitors its own power consumption or logic activity and when inactive during the DO-LOOP locally issues SSHF 70 which instructs local power control circuit 36 within the inactive subsystem to put that subsystem to sleep, for example, in the same manner as described above.

The operation of system 10, processor 12 and processor or controllers 40, 50, 52, 36, 39 will be better understood by considering the logical timing diagrams illustrated in FIGS. 2–5 for various conditions of operation. The timing diagrams of FIGS. 2–5 are intended to represent the operation of any subsystem of the present invention. For convenience of explanation, in FIGS. 2–5, signals which rise are said to become logical "high" and signals that drop are said to become logical "low", but this is not essential and any convenient definition of logical high and low can be used.

When controllers 50, 52 detect a DO-LOOP, they initialize the system. LF signal 64 goes high at transition 641 indicating that a DO-LOOP is commencing, FLF signal 66 goes high at transition 661 indicating that this is the first loop iteration, and SSF signal 68 goes high at transition 681. These initialization operations occur whenever a DO-LOOP is detected by controllers 50, 52. SSF signal 68 stays high as long as LF stays high and there is no activity in the individual subsystem controllers (e.g., 54A), and correspondingly with the SSF signals for the other subsystem controllers (e.g., 54B–54N) and the remainder of inactive subsystems 60i.

Refer now to FIG. 2, which illustrates the operation under conditions when a subsystem is not required for execution of the DO-LOOP. When FLF signal 66 goes low at 662 indicating that the first iteration has ended, SSF remains high (no activity condition) and SSHF signal 70 rises at transition 701. When SSHF 70 is high the subsystem (e.g., 34A) powers down, e.g., by having SSHF signal 70 cause circuit 36 in the affected subsystem to reduce its power supply voltage or clock frequency, as described above, or in combination with controller 39 or by any other means. When LF goes low at transition 642 indicating that the DO-LOOP has come to an end, SSF 68 goes low at transition 682, thereby causing SSHF to go low at transition 702. When SSHF is low, the idle subsystem powers-up, e.g., by reversing the power-down action.

Figure 3:
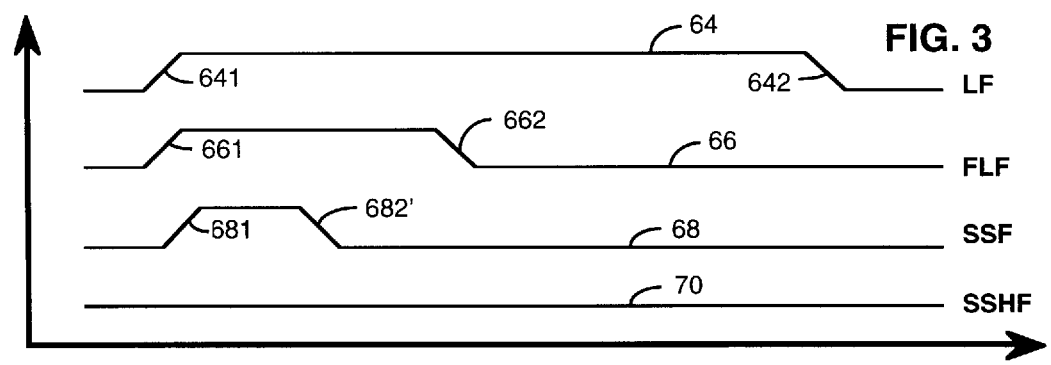

Refer now to FIG. 3, which illustrates the operation of the system under conditions when activity is detected in a particular subsystem, that is, its operation is needed for the DO-LOOP being executed. The detected activity causes SSF 68 to go low at transition 682'. SSHF 70 therefore remains low and power is maintained in the subsystem. FLF 66 goes low at transition 662 indicating that the first iteration has been completed, but this does not change the status of SSF 68 or SSHF 70 which both remain low. At the is completion of the DO-LOOP, LF 64 goes low at transition 642, in the same manner as in FIG. 2 and the system is ready for detection of another DO-LOOP since all other flags (FLF, SSF, SSHF) are already low.

Figure 4:
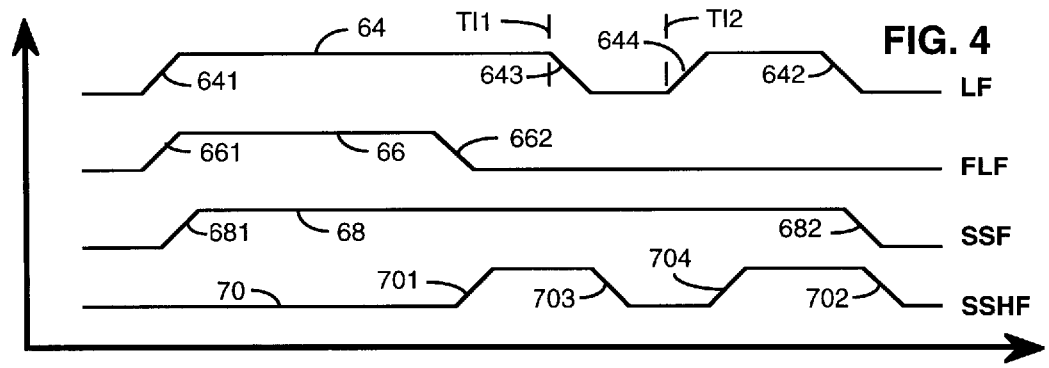

FIG. 4 illustrates operation of the system under conditions when an interrupt occurs at time TI1 after the first iteration but before the DO-LOOP is completed. The cycle illustrated in FIG. 4 begins in the same manner as illustrated in FIG. 2, that is, the system is initialized and LF, FLF and SSF go high at transitions 641, 661 and 681, respectively. It is assumed that no activity is detected prior to FLF going low at transition 662. SSHF rises at transition 701 so that power in the subsystem is turned off, just as in the situation of FIG. 2. However, in FIG. 4, the DO-LOOP is interrupted at TI1 and LF goes low at transition 643. This causes SSHF to drop at transition 703, thereby powering up the subsystem so that it is available for the interrupt function. When the interrupt is complete at TI2, LF goes high at transition 644 and SSHF follows at transition 704. Thereafter the operation continues until the DO-LOOP is completed and LF goes low at transition 642, followed by SSF at transitions 682 and SSHF at transition 702.

Figure 5:
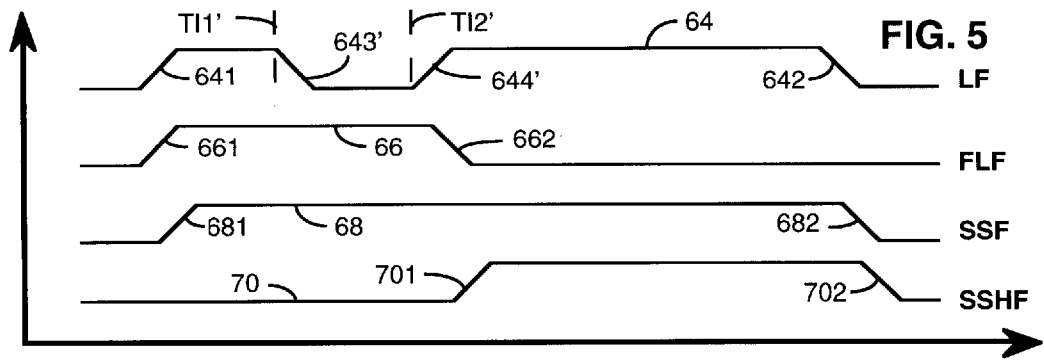
FIGS. 2–5 are a set of timing diagrams for various conditions of operation of the present invention.

FIG. 5 illustrates operation of the system under conditions when an interrupt occurs at time TI1' during the first loop iteration and. The cycle illustrated in FIG. 5 begins in the same manner as illustrated in FIG. 2, that is, LF, FLF and SSF go high at transitions 641, 661 and 681. It is assumed that no activity is detected prior to FLF going low at transition 662. However, in FIG. 5, the DO-LOOP is interrupted at TI1' and LF goes low at transition 643'. SSHF has not yet gone high. In this example, the interrupt ends at TI2' as indicated by LF 64 going high again at transition 644'. Since the interrupt occurred in the first loop iteration, when the interrupt ends, the DO-LOOP continues, still in the first iteration. FLF 66 goes low at the end of the first iteration at transition 662 and SSHF 70 goes high at transition 701 because SSF 68 has remained high (no activity in subsystem A). Thereafter the operation continues until the DO-LOOP is completed and LF goes low at transition 642, followed by SSF at transition 682 and SSHF at transition 702.

Whether or not a particular DO-LOOP leads to a power-down sequence can be chosen by the designer or system programmer, depending upon the functions performed by processor 12 and system 10. For example, the system can be programmed not to respond to DO-LOOPs that involve such a large portion of processor 12 (e.g., subsystems 60a and subsystems 34 are almost coextensive) that little power saving would be obtained. This is accomplished by the criteria established by the designer or programmer for identifying significant DO-LOOPs. As previously explained, suitable DO-LOOPs can be detected by monitoring the instructions being generated by master controller 40 for the presence of pre-determined sets of instruction sequences indicating that a significant DO-LOOP is beginning. Persons of skill in the art will understand how to do this based upon the teachings herein and well known general computer programming principles.

Figure 6:
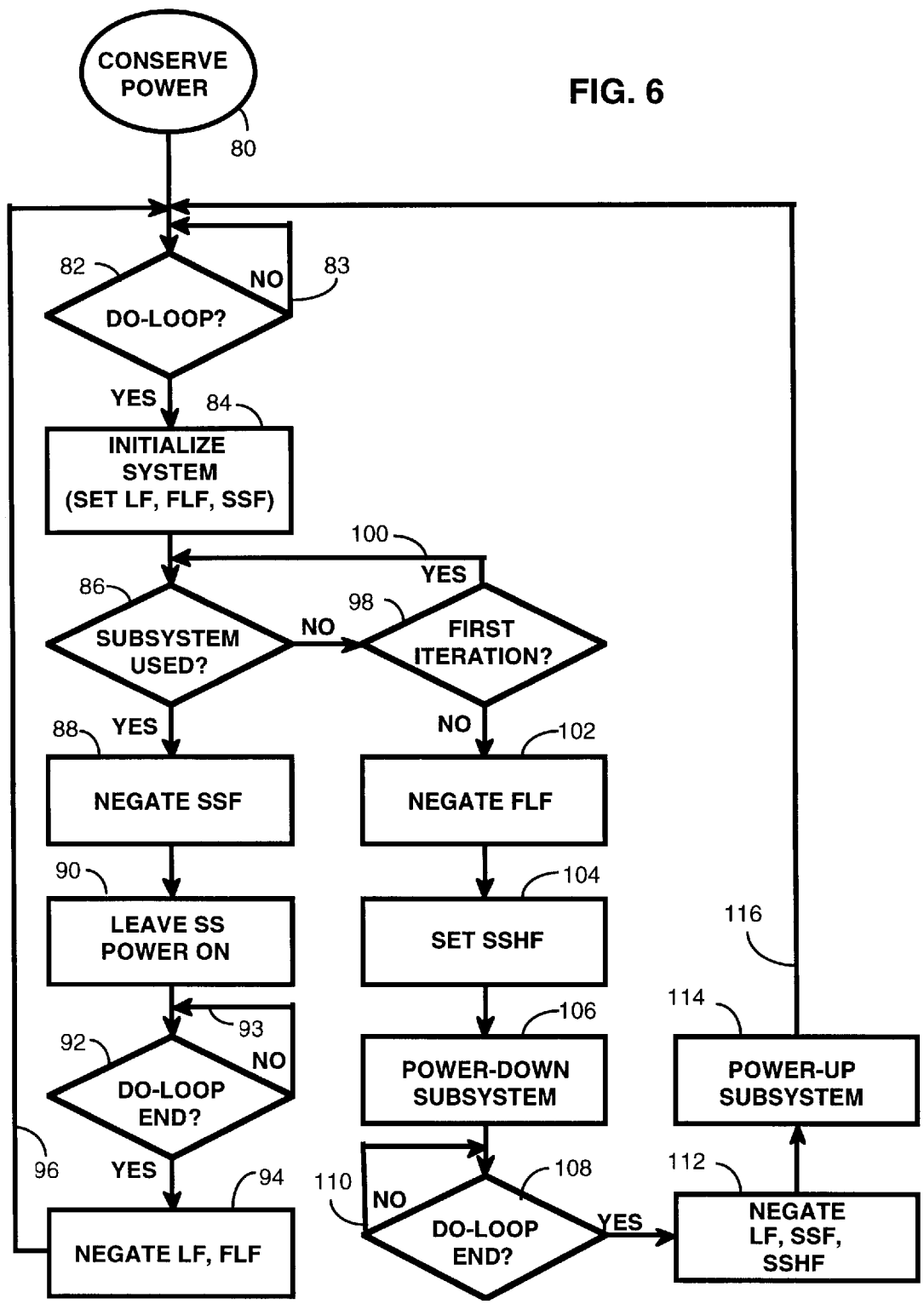
FIG. 6 is a flow chart illustrating a preferred embodiment of the method of the present invention.

FIG. 6 is a flow chart illustrating a preferred embodiment of conserve power method 80 of the present invention. Method 80 begins at query 82 wherein a DO-LOOP start is detected by master controller 40 or repetitive instruction controller 50. If a DO-LOOP is not detected (outcome "NO"), then it loops back via 83 to the input of query 82. If a DO-LOOP is detected (outcome "YES") then method 90 proceeds to step 84 wherein the system is initialized. As previously described, controller 50 generates loop flag (LF) signal 64 and first loop flag (FLF) 66. Subsystem halt controller 52 receives these and generates subsystem flag (SSF) 68, for example, AFLAG, BFLAG . . . NFLAG, addressed to the various subsystems. In query step 86, the subsystems indicate whether they are active, i.e., being used in execution of the first iteration of the DO-LOOP. If the outcome of query 86 is "YES", then in step 88, SSF is negated and in step 90, the subsystem power is left on. Query 92 determines whether the DO-LOOP has ended, and when the outcome is "YES" proceeds to step 94 where LF and FLF are negated, and operation returned via 96 to initial query step 82.

If the outcome of query 86 is "NO", i.e., the subsystem is not used during the first loop iteration, then operation proceeds to query 98 wherein it is determined whether the first operation is still continuing. For outcome "YES", the process cycles back to the input of query 86 until the first loop iteration is completed, i.e., until the outcome of query 98 is "NO", whereupon operation proceeds to step 102 in which FLF is negated. In step 104, SSHF is set and in step 106, subsystems 60i are powered down. The method proceeds to query 108 which loops back via 110 until the DO-LOOP is completed (outcome "YES"). Then in step 112 the LF, SSF and SSHF are negated and in step 114 subsystems 60i are powered-up and control returned via 116 to initial query step 82 to await another DO-LOOP.

Figure 7:
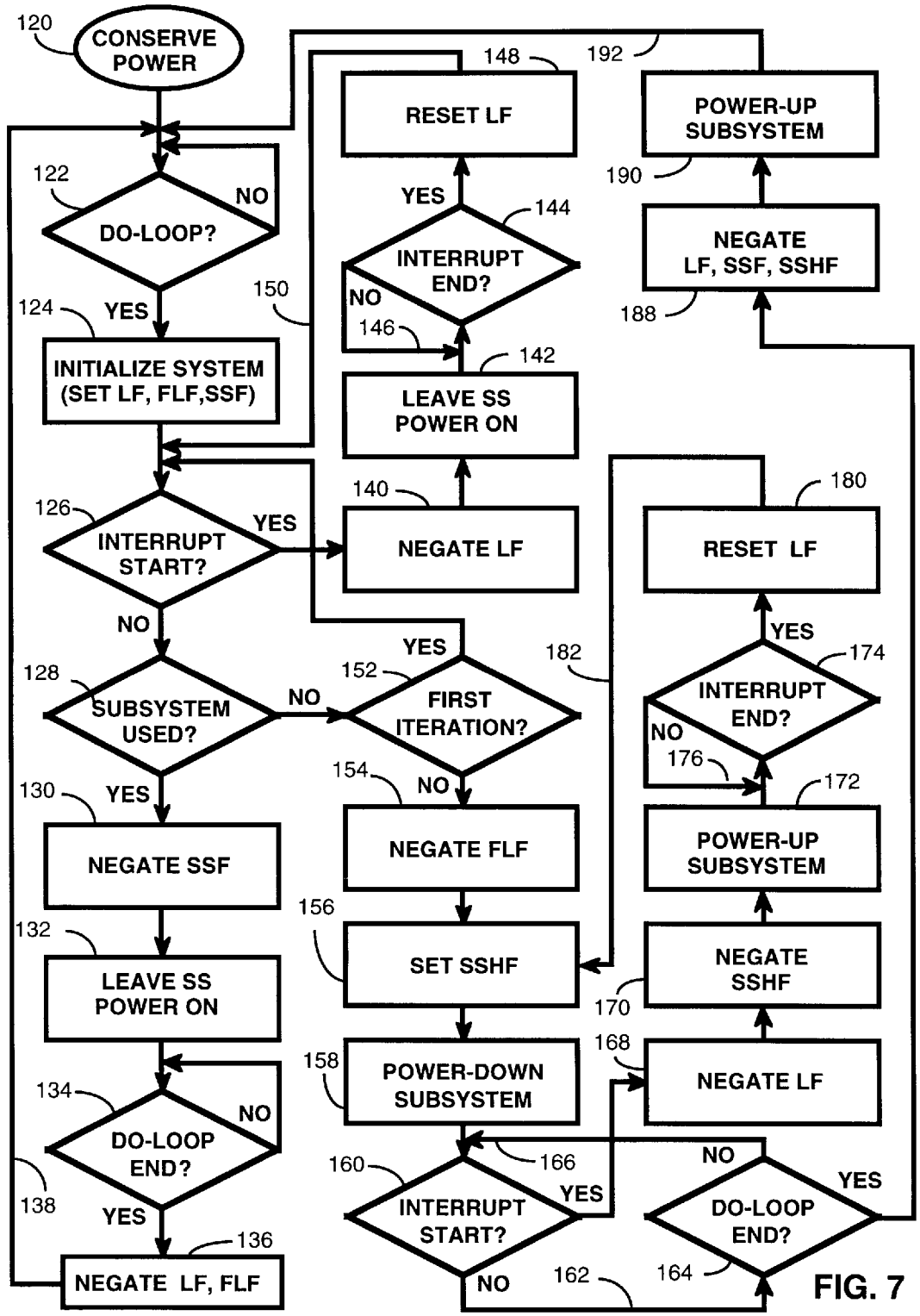
FIG. 7 is a flow chart illustrating a further embodiment of the method of the present invention and showing additional detail.

FIG. 7 is a flow chart illustrating conserve power method 120 according to a further embodiment of the present invention and showing additional detail. Method 120 begins with query 122 analogous to query step 82, wherein it is determined whether or not a DO-LOOP exists. When the answer is "YES" then in step 124 the system is initialized in the same manner as described in connection with step 84 of FIG. 6. Execution then proceeds to interrupt query step 126.

If no interrupt has started (outcome "NO") then execution proceeds to query step 128 analogous to query step 86. Steps 130, 132, 134 and 136 are analogous to steps 88, 90, 92, and 94 and loop back 138 is analogous to loop back 96.

If the outcome of query 126 is "YES" (an interrupt has started), then execution proceeds to step 140 where LF is negated and step 142 where the subsystem power is left on and step 144. Step 144 cycles through loop-back 146 until the interrupt ends (step 144 outcome "YES"). In step 148, the LF is reset and control returned to the input of query 126. If the outcome of query 128 is "NO" (the subsystem is not active during the first iteration), then query 152 is performed to determine whether execution is still in the first loop iteration. If the outcome of query step 152 is "YES" then control loops back to the beginning of step 126. If the outcome of query 152 is "NO" (no longer the first loop iteration), then the process proceeds to step 154 in which FLF is negated, step 156 in which the SSHF is set, and step 158 in which subsystems 60i are powered-down.

Query 160 tests for an interrupt. If the outcome is "NO", then operation proceeds along 162 to query 164 which recursively tests for the end of the DO-LOOP via 166 and 160 until the outcome is "YES" (DO-LOOP has ended), whereupon LF, SSF and SSHF are negated in step 188, subsystems 60i powered-up in step 190 and control returned via 192 to initial DO-LOOP query 122.

If the outcome of query 160 is "YES" (interrupt has started), then LF is negated in step 168, SSHF negated in step 170 and the system powered-up in step 172. "Interrupt end?" query 174 recursively cycles via 176 until the outcome of query 174 is "YES", indicating that the DO-LOOP can resume where it left off. LF is reset in step 180 and operation returned via 182 to 156 where SSHF is reset, the system powers-down in step 158 and operation proceeds in the manner already described until another interrupt occurs detected by query 160 or the DO-LOOP ends, as detected by query 164.

It will be noted that step 128 wherein it is determined whether the subsystems are active occurs during the first iteration of the DO-LOOP and that the power shut-down in step 158 occurs after it has been determined during the first iteration that operation of a particular subsystem is not required for that DO-LOOP.

The foregoing has described operation of the present invention with and without interrupts for the case of a simple DO-LOOP. However, the present invention is also useful with more complex DO-LOOPs, as for example, a conditional DO-LOOP or a branching DO-LOOP. If a change of flow instructions (e.g., an unconditional jump or a jump subroutine) appears in a first iteration, the behavior is similar to the normal operation described above since the flow is determined and is unchanged (although complex) during the remainder of the iterations. If there is a data-dependent change in flow (e.g., a conditional jump or conditional jump subroutine), then subsequent iterations can require different subsystems than the first iteration and the present method is generally not expected to yield much power saving, since the subsystems should power-up when the conditional jump appears.

Another situation that frequently occurs is nested loops. The present invention can be applied to nested loops by having the SSF and SSHF information for the various subsystems saved, for example, in a stack in registers 34C or memory 22 and recalled when each nested loop commences.

While the present invention is particularly convenient for use in connection with processors that have specific DO-LOOP instructions in their instructions set so that LF and FLF can be readily obtained, this is not essential. No matter what the processor instruction set, a DO-LOOP will require in general the execution of various predeterminable sequences of instructions from the instruction set. Thus, persons of skill in the programming art can examine the instructions set and readily determine what sequence of instructions identifies a repetitive operation providing a significant opportunity to conserve power. A trap can be provided to detect such sequences and thereby be able to generate the LF and FLF flags of the present invention or their equivalent.

The present invention has the advantages that:

(a) It is generally useful for power conservation in processors and systems and is not limited merely to peripherals;

(b) Once a processor has been modified so as to operate in the manner described above, the power saving is done automatically without intervention by the system user;

(c) It applies to any kind of repetitive operation that involves less than all of the subsystems in a particular processor or system; and (d) It can save significant power in processors performing common repetitive operations.

Having described the invention, those of skill in the art will understand that numerous variation can be made without departing from the above-described invention. For example, the order of specific steps in the method can be varied while still obtaining an equivalent result. Further, while repetitive instruction controller 50 and subsystems halt controller 52 are illustrated in FIG. 1 as being specifically identifiable separate functional blocks, those of skill in the art will understand that their function can easily be incorporated in master controller 40 without departing from the present invention, as indicated by dashed lines 40', 40". For example, where system 10 contains general purpose processor 12 adapted to software control and programming, the functions described for repetitive instruction controller 50 and subsystems halt controller 42 can be performed by master controller 40 or other processor under software control and thereby execute the functions described herein. Accordingly, it is intended to include in the claims that follow, these and other variations that will occur to persons of skill in the art based upon the teachings herein.

We claim:

1. A variable power consuming system having subsystems, comprising:

a controller coupled to the subsystems for initiating a repetitive operation to be performed by some of the subsystems and not by others of the subsystems;

a first means coupled to the subsystems for identifying the others of the subsystems during a first iteration of the repetitive operation; and a second means coupled to the subsystems for reducing power consumption of the others of the subsystems during subsequent iterations of the repetitive operation.

2. The system of claim 1 wherein the second means restores the others of the subsystems to full power operation following completion of the repetitive operation.

3. The system of claim 1 wherein the second means further comprises a further controller responsive to the first means for restoring power to the others of the subsystems when the repetitive operation is interrupted.

4. A variable power consuming system having subsystems, comprising:

a controller coupled to the subsystems for initiating a repetitive operation to be performed by some of the subsystems and not by others of the subsystems;

a first means coupled to the subsystems for identifying the others of the subsystems during a first iteration of the repetitive operation; and a second means coupled to the subsystems for reducing power consumption of the others of the subsystems during subsequent iterations of the repetitive operation;

wherein, at initiation of the repetitive operation, the controller issues a loop flag indicating that a repetitive operation is commencing and issues a first loop flag having a duration substantially equal to the duration of the first iteration of the repetitive operation.

5. The system of claim 4 wherein the controller issues a subsystem flag causing the others of the subsystems to identify themselves as not being used during the first iteration of the repetitive operation.

6. The system of claim 5 wherein the second means issues or receives a subsystem halt flag for each of the others of the subsystems indicating that a power-down can be performed for the others of the subsystems.

7. A method for reducing power consumption in a system having subsystems, comprising the steps of:

identifying a set of repetitive operations;

determining a first portion of the subsystems not needed for execution of the repetitive operation; and prior to completion of the set of repetitive operation, placing the first portion of the subsystems in a state wherein the first portion of the subsystems consume less power.

8. The method of claim 7 wherein the determining step occurs during a first iteration of the set of repetitive operations.

9. The method of claim 8 further comprising the step of terminating the state wherein the first portion of the subsystems consume less power, after completion of the set of repetitive operation.

10. The method of claim 7 further comprising the step of terminating the state wherein the first portion of the subsystems consume less power, after completion of the set of repetitive operation.

\* \* \* \* \*